(12) United States Patent
Yang et al.

(10) Patent No.: US 11,431,440 B2
(45) Date of Patent: Aug. 30, 2022

(54) ITERATIVE DETECTION AND DECODING CIRCUIT, ITERATIVE DETECTION AND DECODING METHOD AND MIMO RECEIVER

(71) Applicant: Realtek Semiconductor Corporation, Hsinchu (TW)

(72) Inventors: Chia-Hsiang Yang, Kinmen County (TW); Yao-Pin Wang, Kaohsiung (TW); Chi-Chih Wen, Taipei (TW); Der-Zheng Liu, Hsinchu County (TW); Chung-Jung Huang, New Taipei (TW)

(73) Assignee: REALTEK SEMICONDUCTOR CORPORATION, Hsinchu (TW)

(*) Notice: Subject to any disclaimer, the term of this patent is extended or adjusted under 35 U.S.C. 154(b) by 0 days.

(21) Appl. No.: 16/455,956

(22) Filed: Jun. 28, 2019

(65) Prior Publication Data
US 2020/0295864 A1 Sep. 17, 2020

(30) Foreign Application Priority Data

Mar. 15, 2019 (TW) ................. 108108968

(51) Int. Cl.
*H04L 1/00* (2006.01)
*H04B 7/08* (2006.01)

(52) U.S. Cl.
CPC ............ *H04L 1/005* (2013.01); *H04B 7/0885* (2013.01); *H04L 1/0057* (2013.01)

(58) Field of Classification Search
CPC ...... H04L 1/005; H04L 1/0057; H04B 7/0885
See application file for complete search history.

(56) References Cited

U.S. PATENT DOCUMENTS

| | | | |
|---|---|---|---|
| 8,989,252 B1 | 3/2015 | Varnica et al. | |
| 2008/0285671 A1* | 11/2008 | Sundberg | H04L 1/0631 375/260 |
| 2010/0031113 A1* | 2/2010 | Chang | H04L 25/03242 714/752 |
| 2013/0151911 A1 | 6/2013 | Dick et al. | |
| 2019/0288883 A1* | 9/2019 | Ben-Arie | H04L 25/03891 |

OTHER PUBLICATIONS

W. Sun, W. Wu, C. Yang and Y. Ueng, "An Iterative Detection and Decoding Receiver for LDPC-Coded MIMO Systems," in IEEE Transactions on Circuits and Systems I: Regular Papers, vol. 62, No. 10, pp. 2512-2522, Oct. 2015, doi: 10.1109/TCSI.2015.2468998. (Year: 2015).*

* cited by examiner

*Primary Examiner* — Sam K Ahn
*Assistant Examiner* — Amneet Singh
(74) *Attorney, Agent, or Firm* — Locke Lord LLP; Tim Tingkang Xia, Esq.

(57) ABSTRACT

An iterative detection and decoding (IDD) circuit is provided. The iterative detection and decoding (IDD) circuit is configured to perform M outer iterations on a received signal, and $N_i$ inner iterations are performed during the $i^{th}$ outer iteration of the M outer iterations, where M is an integer greater than 1, i is an integer less than or equal to M, and $N_1$ to $N_M$ are integers and include at least two different values.

16 Claims, 6 Drawing Sheets

ITERATIVE DETECTION AND DECODING CIRCUIT, ITERATIVE DETECTION AND DECODING METHOD AND MIMO RECEIVER

RELATED APPLICATIONS

This application claims priority to Taiwan Application Serial Number 108108968, filed on Mar. 15, 2019, which is herein incorporated by reference.

BACKGROUND

Field of Disclosure

The present disclosure relates to a circuit with iterative detection and decoding (IDD) technology, an IDD method and a multiple-input multiple-output (MIMO) receiver.

Description of Related Art

In recent years, the rapid development of information technology led to an increasing demand for the high transmission rate, and the industry has purposed corresponding solutions. Among these solutions, the multiple-input multiple-output (MIMO) technology allows an antenna array of multiple antennas to perform signal transmissions and receptions to meet high transmission rate requirement. However, for MIMO communication systems, the demapping and decoding complexity and the number of operations significantly increases with the increasing number of transmission/reception antennas, the number of symbol bits and/or the code constraint length, resulting in limited transmission performance.

SUMMARY

A major objective of the present disclosure is to provide an iterative detection and decoding (IDD) circuit adopting IDD technology, an IDD method and a multiple-input multiple-output (MIMO) receiver which can improve packet error rate and reduce operational complexity for at high transfer rate requirements, thereby increasing transmission efficiency.

An aspect of the present disclosure is an IDD circuit configured to perform M outer iterations on a received signal and to perform $N_i$ inner iterations during an $i^{th}$ outer iteration of the outer iterations, where M is an integer greater than 1, i is an integer less than or equal to M, and $N_1$ to $N_M$ are all integers and include at least two different values.

Another aspect of the present disclosure provides an IDD method including performing M outer iterations on a received signal and performing $N_i$ inner iterations during an $i^{th}$ outer iteration of the outer iterations, where M is an integer greater than 1, i is an integer less than or equal to M, and $N_1$ to $N_M$ are all integers and include at least two different values.

Another aspect of the present disclosure provides a MIMO receiver including plural antennas, a demapper and an IDD circuit. The antennas are configured to receive MIMO signals. The demapper is coupled to the antennas and is configured to demodulate the MIMO signals. The IDD circuit is coupled to the demapper. The IDD circuit is configured to perform M outer iterations on the MIMO signal to obtain a decoded signal, and to perform $N_i$ inner iterations during an $i^{th}$ outer iteration of the outer iterations, where M is an integer greater than 1, i is an integer less than or equal to M, and $N_1$ to $N_M$ are all integers and include at least two different values.

BRIEF DESCRIPTION OF THE DRAWINGS

The foregoing aspects and many of the accompanying advantages of this disclosure will become more readily appreciated as the same disclosure becomes better understood by reference to the following detailed description, when taken in conjunction with the accompanying drawings.

FIG. 3A to FIG. 3C are graphs showing the relationship between K value and signal-to-noise ratio (SNR) for various iterative methods under the environment of 4×4 MIMO, B/D/E channel, modulation and coding scheme (MCS) of MCS-11, low-density parity check (LDPC) decoding and PER equal to 0.1.

FIG. 4A to FIG. 4C are graphs showing the relationship between SNR and PER under the environment of high performance 4×4 MIMO, B/D/E channel, MCS-11, LDPC decoding and K value equal to 64.

DETAILED DESCRIPTION

The detailed explanation of the present disclosure is described as following. The described preferred embodiments are presented for purposes of illustrations and description, and they are not intended to limit the scope of the present disclosure.

In the following description, the term "coupled" may be used to indicate that two or more elements are in direct physical or electrical contact with each other, or may also mean that two or more elements may not be in direct contact with each other. "Coupled" may still be used to indicate that two or more elements cooperate or interact with each other.

It will be understood that, although the terms "first," "second," etc. may be used herein to describe various signals and/or entitles, these signals and/or entities should not be limited by these terms. These terms are only used to distinguish signals and/or entities.

Figure 1:
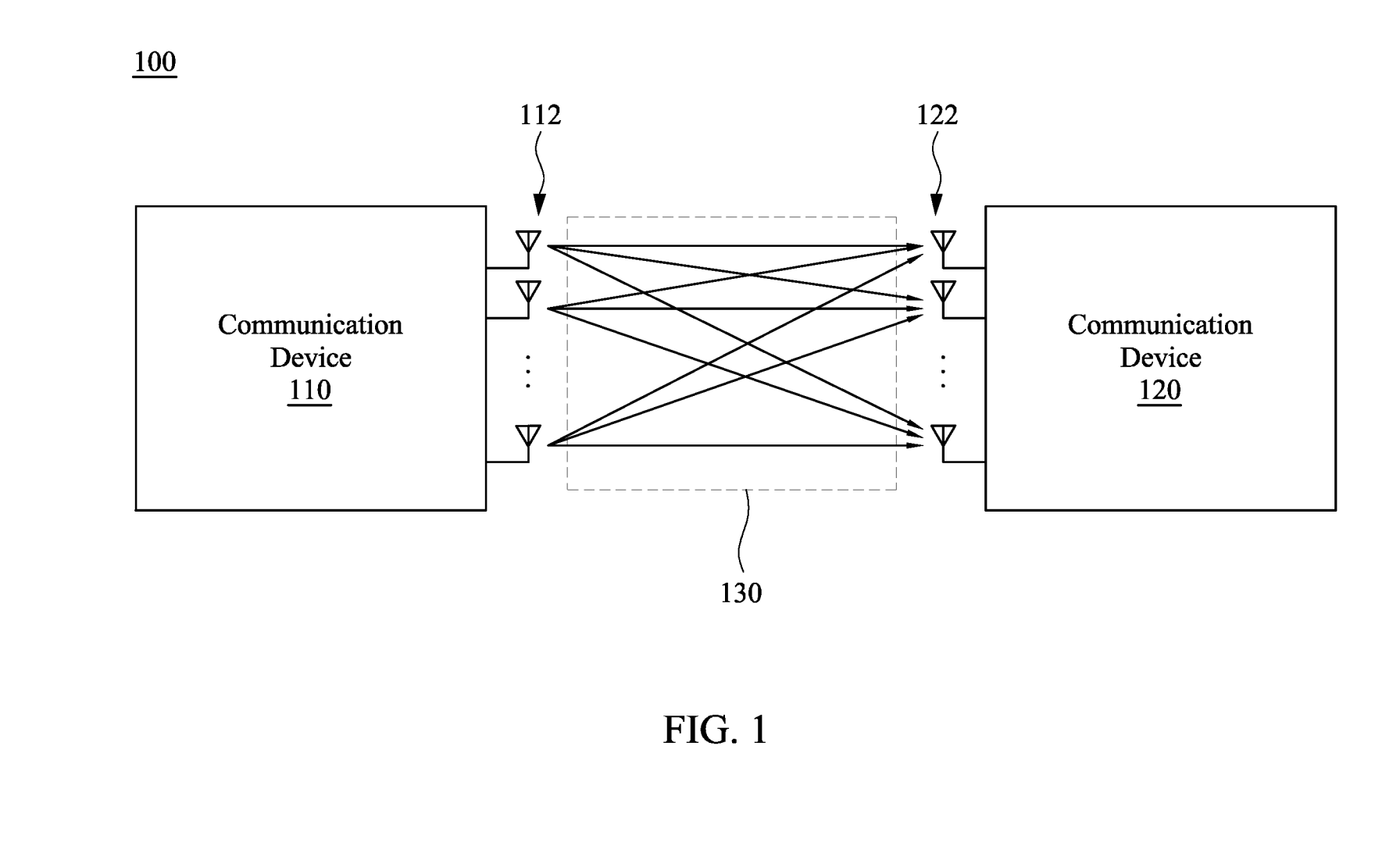
FIG. 1 is a schematic diagram of a communication system in accordance with some embodiments of the disclosure.

Referring FIG. 1, FIG. 1 is a schematic diagram of a communication system 100 in accordance with some embodiments of the disclosure. The communication system 100 may adopt communication technology such as wireless local area network communication technology, cellular network communication technology, long-term evolution advanced (LTE-Advanced) communication technology, and/or another suitable wireless communication technology. The communication system 100 includes communication devices 110, 120 and a wireless channel 130, in which the communication devices 110, 120 are communicatively connected through the wireless channel 130. Each of the communication devices 110, 120 may be used as signal transmission terminals, signal reception terminals or signal transmission/reception terminals. The communication devices 110, 120 respectively include antenna arrays 112, 122 which are formed of antennas, and perform wireless communication through the wireless channel 130. The number of the antenna array 112 may be the same as or different from the number of the antenna array 122. In addition, all or some antennas of the antenna array 112 and all or some antennas of the antenna array 122 may be optionally activated in the signal communication between the communication devices 110, 120 to perform radiation signal transmission and reception. The wireless channel 130 may support multiple-input multiple-output (MIMO) transmissions, multiple-input single-output (MISO) transmissions, single-input multiple-output (SIMO) transmissions and single-input single-output (SISO) transmissions between the communication devices 110, 120.

In the context, the communication device (e.g. the communication device 110, 120) may be implemented as a device including, but not limited to, a mobile device such as a station (STA), a mobile station (MS), a user equipment (UE), a notebook, a mobile phone and a fixed device such as an access point (AP), a base station (BS), an evolved NodeB (eNB), a computer device, a server device and a workstation. In addition, the communication device in this context may perform wireless communication with a remote entity under a mobile environment or a fixed environment.

Figure 2:
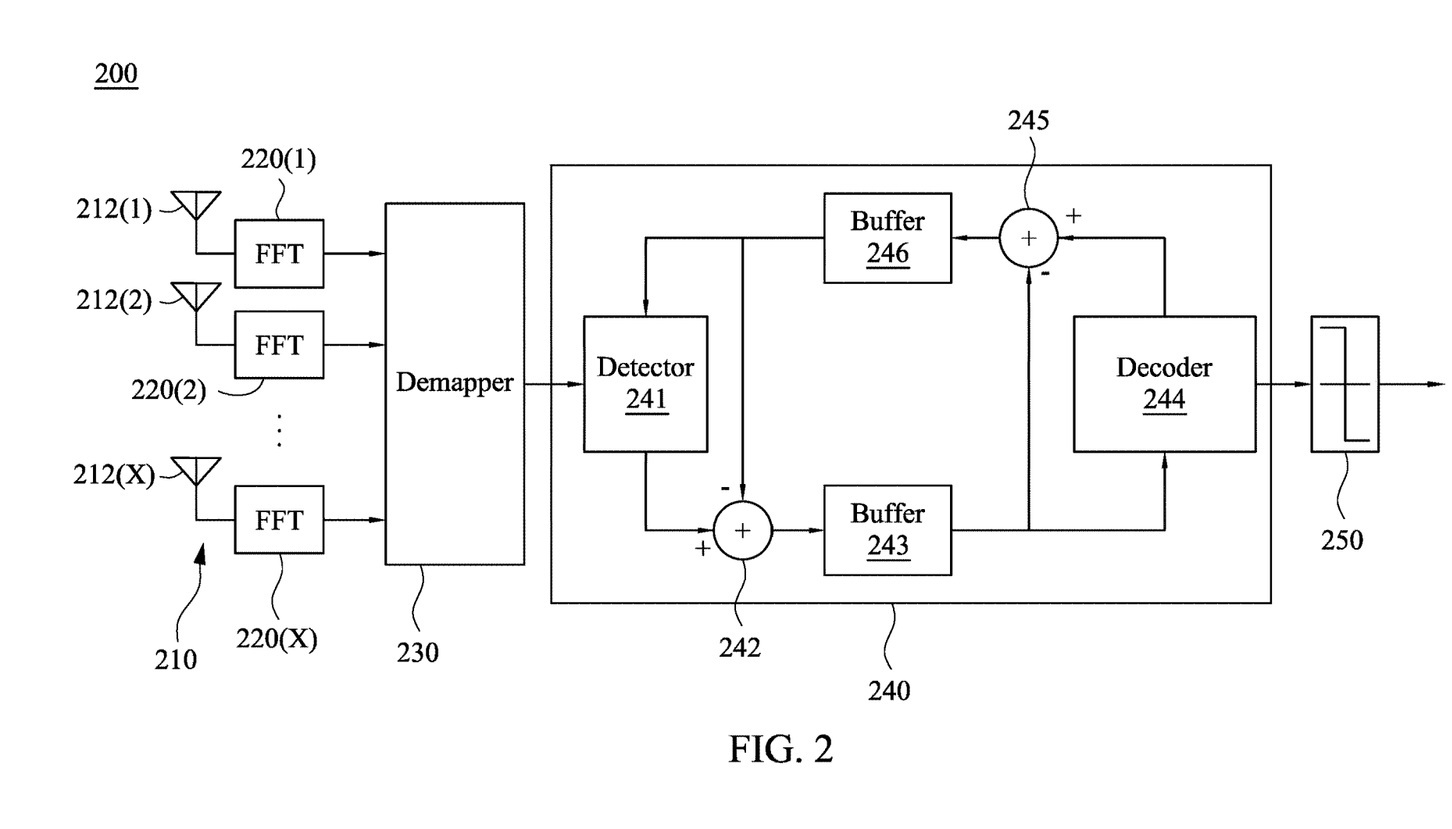
FIG. 2 is a schematic diagram of a MIMO receiver in accordance with some embodiments of the disclosure.

FIG. 2 is a schematic diagram of a MIMO receiver 200 in accordance with some embodiments of the disclosure. The MIMO receiver 200 includes an antenna array 210, fast Fourier transformers (FFT) 220(1)-220(X), a demapper 230, an IDD circuit 240 and a decision circuit 250. The MIMO receiver 200 may be applied in the communication system 100 of FIG. 1, and the communication device 110 and/or the communication device 120 in FIG. 1 may be implemented as the MIMO receiver 200 or another device having the functions of the MIMO receiver 200.

The antenna array 210 includes antennas 212(1)-212(X) configured to receive MIMO signals, the FFTs 220(1)-220(X) are configured to convert the received MIMO signals from time domain or spatial domain to frequency domain, and the demapper 230 is configured to demodulate the MIMO signals. The IDD circuit 240 is coupled to the demapper 230 and is configured to perform outer iterations on the MIMO signals to obtain a decoded signal. The decision circuit 250 is configured to convert the decoded signal outputted by the IDD circuit 240 into binary data. In some embodiments, the decision circuit 250 is a hard-decision circuit which is configured to compare the level of the decoded signal outputted by the IDD circuit 240 with a threshold value to determine the bit value representing the level of the decoded signal.

In the IDD circuit 240, a detector 241 receives an input signal from the demapper 230 and a delayed signal from a buffer 246, and detects the input signal to generate a first detection result; an adder 242 summarize the first detection result and the delayed signal from the buffer 246 to generate an added signal. A buffer 243 keeps and delays the added signal from the adder 242 to generate a delayed signal; a decoder 244 receives and decodes the delayed signal from the buffer 243 to generate a decoded signal; an adder 245 summarizes the decoded signal and the delayed signal from the buffer 243 to generate an added signal; the buffer 246 keeps and delays the added signal from the adder 245 to generate a delayed signal. In the iterative operations performed by the IDD circuit 240, the iterations between the detector 241 and the decoder 244 are outer iterations, and the iterations in the interior of the decoder 244 are inner iterations.

In some embodiments, the detector 241 is a soft input soft output (SISO) MIMO detector, the decoder 244 is a SISO error correction code (ECC) decoder, and the detector 241 exchanges external messages with the decoder 244. Further, the detector 241 may adopt a SISO K-best detection method or a SISO lattice reduction (LR) aided K-best detection method (i.e. perform a SISO K-best algorithm or a LR SISO aided K-best algorithm), and the decoder 244 may be a low-density parity check (LDPC) decoder. In some other embodiments, the decoder 244 may be a binary convolutional code (BCC) decoder.

In the following description, (M,N) iterative method represents performing M outer iterations and performing N inner iterations during each outer iteration; $(2,N_1/N_2)$ iterative method represents performing 2 outer iterations, of which $N_1$ inner iterations are performed during the first outer iteration, and $N_2$ inner iterations are performed during the second outer iteration; $(3,N_1/N_2/N_3)$ iterative method represents performing 3 outer iterations, of which $N_1$ inner iterations are performed during the first outer iteration, and $N_2$ inner iterations are performed during the second outer iteration, and $N_3$ inner iterations are performed during the third outer iteration.

Figure 3A:
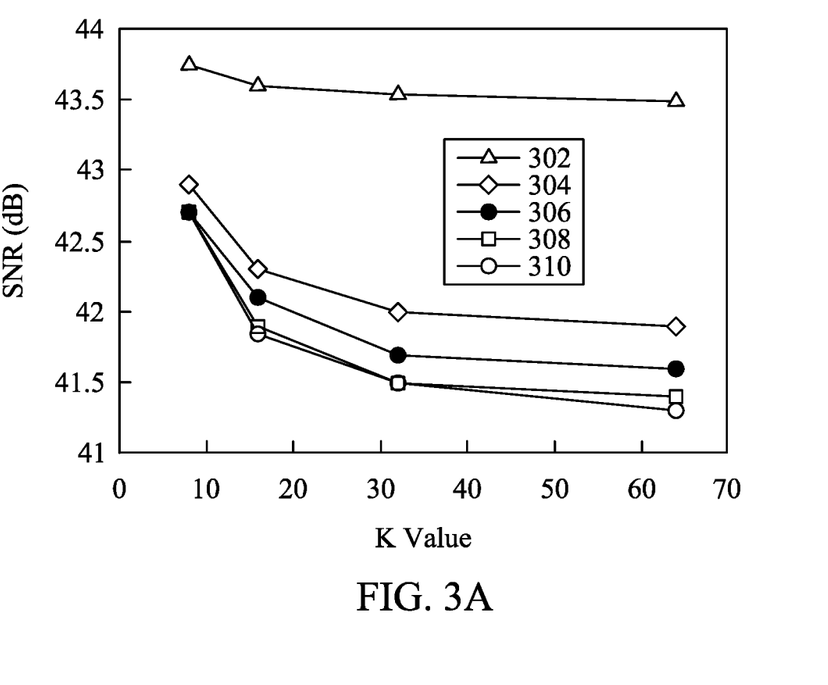
Figure 3B:
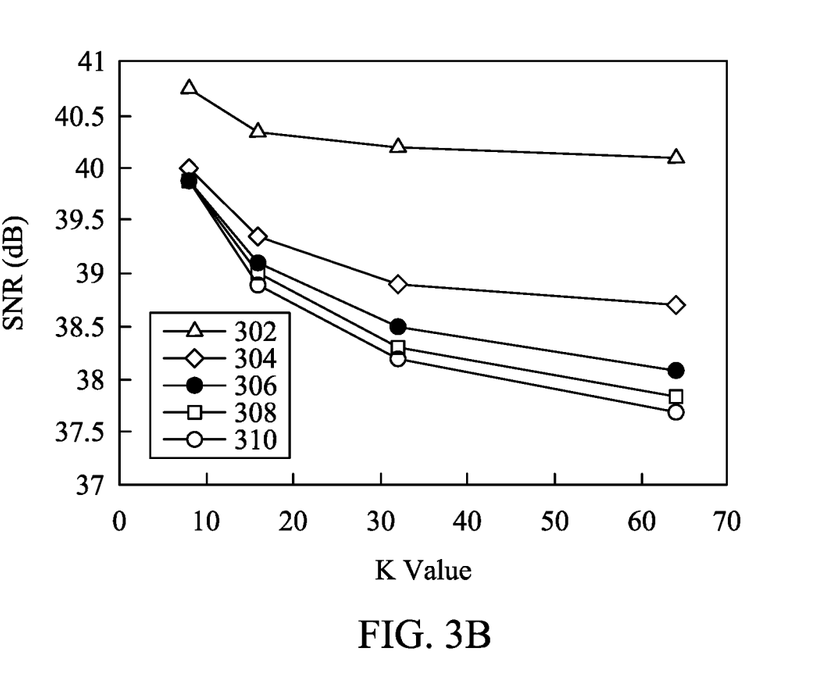
Figure 3C:
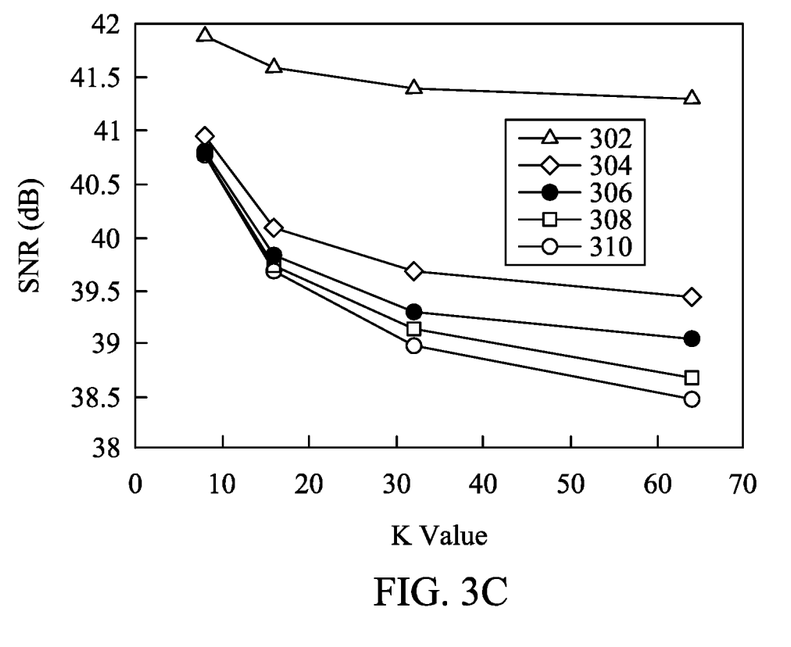

FIG. 3A to FIG. 3C are graphs showing the relationship between K value and signal-to-noise ratio (SNR) for various iterative methods under the environment of 4×4 MIMO, B/D/E channel, modulation and coding scheme (MCS) of MCS-11, LDPC decoding and PER equal to 0.1, in which the K value is the candidate size parameter of a K-best detection method. In the graphs of FIG. 3A to FIG. 3C, curves 302, 304, 306, 308, 310 respectively represent (1,12), (2,12), (3,12), (4,12) and (5,12) iterative methods. As can be seen from FIG. 3A to FIG. 3C, the SNR is reduced with the increasing number of the outer iterations, the SNR difference between the curve 302 and the curve 304 is greater than 1 dB, the SNR difference between the curve 304 and the curve 306 is between 0.3 dB and 0.5 dB, and the SNR difference between the curve 306 and the curve 308 is less than 0.3 dB. In addition, for each of the curves 304, 306, 308, 310 and corresponding the same channel, the SNR difference between the K value of 32 and the K value of 64 does not exceed 0.5 dB, and is less than the SNR difference between the K value of 16 and the K value of 32.

Figure 4A:
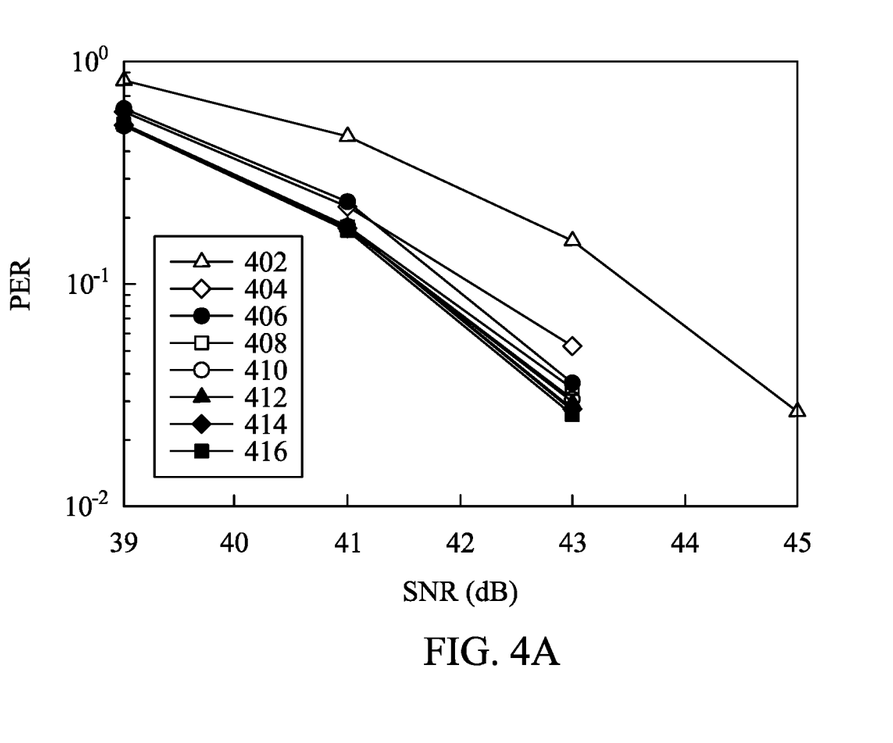
Figure 4B:
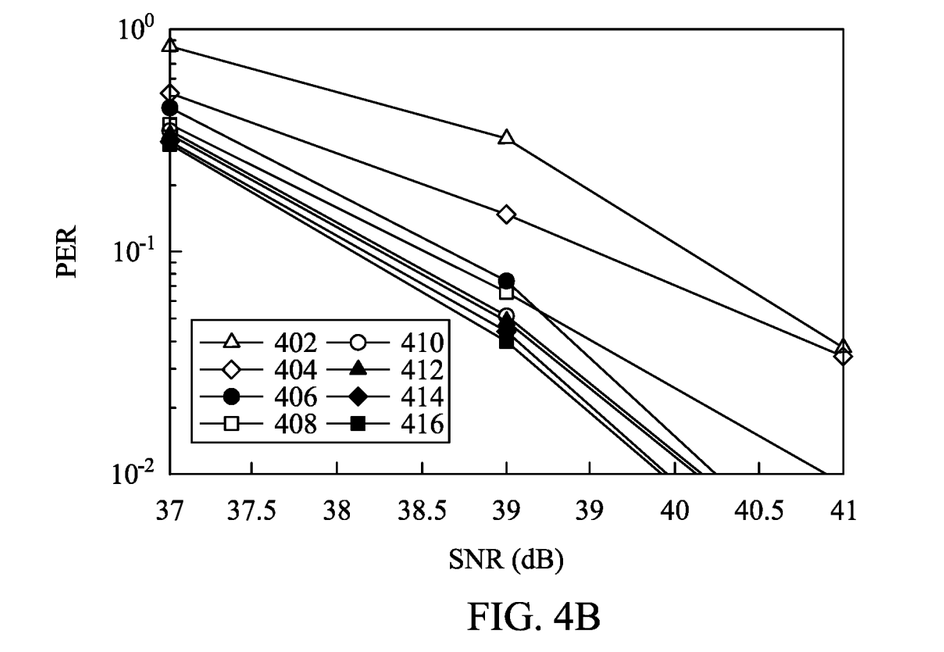
Figure 4C:
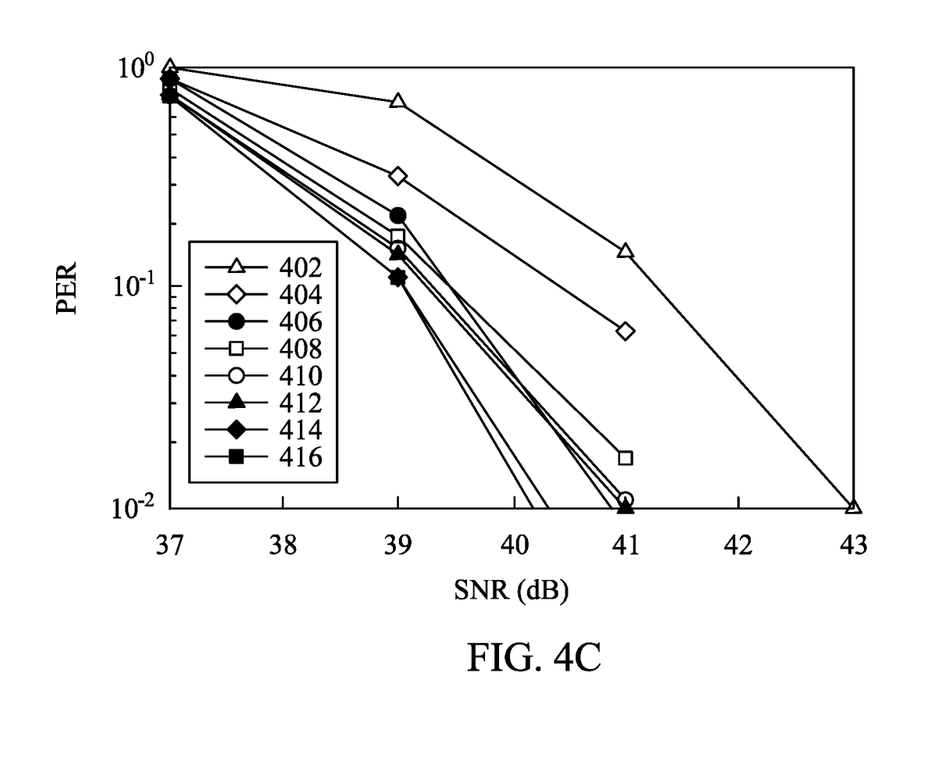

FIG. 4A to FIG. 4C are graphs showing the relationship between SNR and PER under the environment of high performance 4×4 MIMO, B/D/E channel, MCS-11, LDPC decoding and K value equal to 64. In the graphs of FIG. 4A to FIG. 4C, curves 402, 404, 406, 408, 410, 412, 414, 416 respectively represent (1,12), (3,2/8/2), (2,12/12), (3,2/6/4), (3,2/4/6), (3,6/6/6), (3,2/4/12) and (3,12/12/12) iterative methods. As can be seen from FIG. 4A to FIG. 4C, for the iterative methods with the same number of total inner iterations, the iterative method with greater number of outer iterations has better PER performance under the same SNR, and furthermore, for the iterative methods with the same number of total inner iterations and the same number of outer iterations, the iterative method with gradually increasing inner iterations has better PER performance under the same SNR. In addition, the PER performances of the (3,2/4/6) and (3,6/6/6) iterative methods are similar under the same SNR, and the PER performances of the (3,2/4/12) iterative method and the (3,12/12/12) iterative method are similar under the same SNR.

Figure 5:
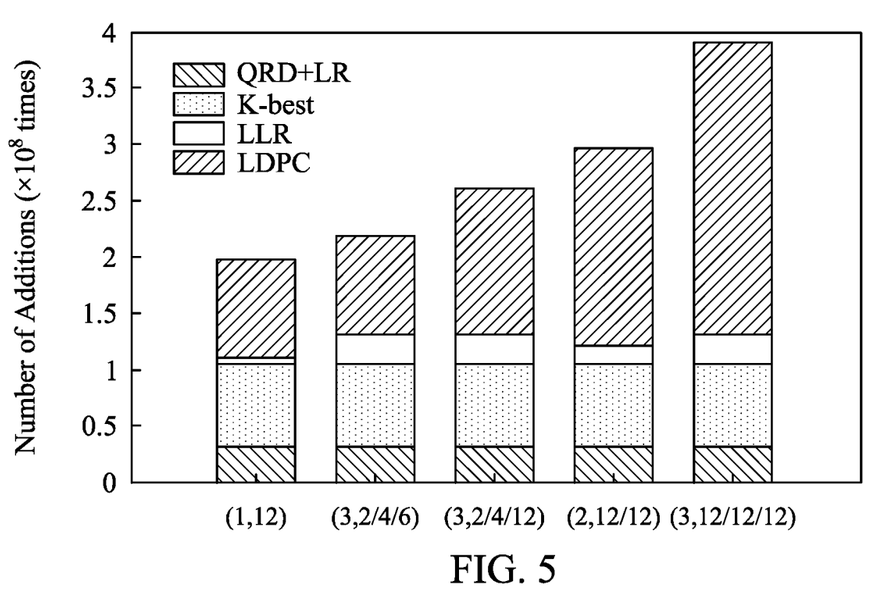
FIG. 5 is a statistical diagram of the number of additions for various iterative methods under the environment of 4×4 MIMO, 160 MHz channel bandwidth, MCS-11, LDPC decoding and K value equal to 64.

FIG. 5 is a statistical diagram of the number of additions for various iterative methods under the environment of 4×4 MIMO, 160 MHz channel bandwidth, MCS-11, LDPC decoding and K value equal to 64. In FIG. 5, "QRD+LR,"

"K-best," "LLR" and "LDPC" are respectively a QR decomposition plus an LR operation, a K-best detection method, a log likelihood ratio (LLR) operation and an LDPC decoding operation. As can be seen from FIG. 5, the number of additions for the (3,2/4/6) iterative method is greater than the number of additions for the (1,12) iterative method by only about 10%, while the number of additions for the (3,2/4/12) iterative method is greater than the number of additions for the (1,12) iterative method by about 25% but is less than the number of additions for the (2,12/12) iterative method.

Figure 6:
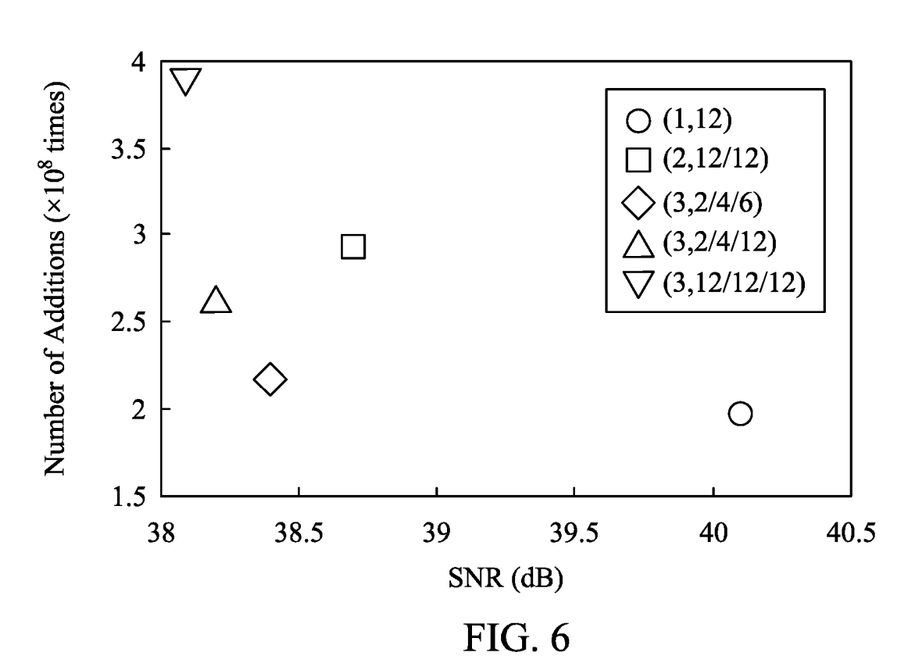
FIG. 6 is a mapping diagram showing the number of additions corresponding to the PER of 0.1 for various iterative methods under the environment of 4×4 MIMO, D channel, MCS-11, LDPC decoding and K value equal to 64.

FIG. 6 is a mapping diagram showing the number of additions corresponding to the PER of 0.1 for various iterative methods under the environment of 4×4 MIMO, D channel, MCS-11, LDPC decoding and K value equal to 64. As can be seen from FIG. 6, the (3,2/4/6) iterative method and the (3,2/4/12) iterative method have superior overall performance with regard to number of additions and PER performance. For practical applications, the (3,2/4/12) iterative method may be applied if the PER performance is a primary consideration, while the (3,2/4/6) iterative method may be selected if the complexity (the number of operations) is a primary consideration.

It will be apparent to those skilled in the art that various modifications and variations can be made to the structure of the present disclosure without departing from the scope or spirit of the present disclosure. In view of the foregoing, it is intended that the present disclosure cover modifications and variations of this disclosure provided they fall within the scope of the following claims.

What is claimed is:

1. An iterative detection and decoding (IDD) circuit, comprising:
a detector configured to receive an input signal and a first delayed signal and to detect the input signal to generate a first detection result;
a first adder coupled to the detector, the first adder configured to summarize the first detection result and the first delayed signal to generate a first added signal;
a first buffer coupled to the first adder, the first buffer configured to keep and delay the first added signal to generate a second delayed signal;
a decoder coupled to the first buffer, the decoder configured to receive and decode the first delayed signal to generate a decoded signal;
a second adder coupled to the decoder and the first buffer, the second adder configured to summarize the decoded signal and the second delayed signal to generate a second added signal; and
a second buffer coupled to the first adder, the second adder and the detector, the second buffer configured to keep and delay the second added signal to generate the first delayed signal;
wherein the IDD circuit is configured to perform M outer iterations on the input signal between the detector and the decoder, of which $N_i$ inner iterations are performed in the decoder during an $i^{th}$ outer iteration of the M outer iterations, wherein M is an integer greater than 1, i is an integer less than or equal to M, and $N_1$ to $N_M$ are all integers and are in a strictly increasing sequence.

2. The IDD circuit of claim 1, wherein M is 3.

3. The IDD circuit of claim 2, wherein $N_1$, $N_2$ and $N_3$ are respectively 2, 4 and 6.

4. The IDD circuit of claim 1, wherein the detector is a soft input soft output (SISO) detector, and the decoder is an SISO decoder.

5. The IDD circuit of claim 4, wherein the SISO detector is operated by performing a K-best detection algorithm.

6. The IDD circuit of claim 5, wherein a candidate size parameter of the K-best detection algorithm is 32.

7. The IDD circuit of claim 5, wherein a candidate size parameter of the K-best detection algorithm is 64.

8. The IDD circuit of claim 5, wherein the decoder is a low-density parity check (LDPC) decoder or a binary convolutional code (BCC) decoder.

9. An iterative detection and decoding (IDD) method for an IDD circuit, the method comprising:
receiving an input signal and a first delayed signal, by a detector of the IDD circuit, to detect the input signal to generate a first detection result;
summarizing the first detection result and the first delayed signal, by a first adder of the IDD circuit coupled to the detector, to generate a first added signal;
keeping and delaying the first added signal, by a first buffer of the IDD circuit coupled to the first adder, to generate a second delayed signal;
receiving and decoding the first delayed signal, by a decoder coupled to the first buffer, to generate a decoded signal;
summarizing the decoded signal and the second delayed signal, by a second adder coupled to the decoder and the first buffer, to generate a second added signal;
keeping and delaying the second added signal, by a second buffer of the IDD circuit coupled to the first adder, the second adder and the detector, to generate the first delayed signal;
performing, by the IDD circuit, M outer iterations on the input signal between the detector and the decoder, of which Ni inner iterations are performed in the decoder during an $i^{th}$ outer iteration of the outer iterations;
wherein M is an integer greater than 1, i is an integer less than or equal to M, and $N_1$ to $N_M$ are all integers and are in a strictly increasing sequence.

10. The IDD method of claim 9, wherein M is 3.

11. The IDD method of claim 10, wherein $N_1$, $N_2$ and $N_3$ are respectively 2, 4 and 6.

12. A multiple-input multiple-output (MIMO) receiver, comprising:
a plurality of antennas configured to receive MIMO signals;
a demapper coupled to the antennas, the demapper configured to demodulate the MIMO signals; and
an iterative detection and decoding (IDD) circuit coupled to the demapper, the IDD circuit comprising:
a detector configured to receive the MIMO signals and a first delayed signal and to detect the MIMO signals to generate a first detection result;
a first adder coupled to the detector, the first adder configured to summarize the first detection result and the first delayed signal to generate a first added signal;
a first buffer coupled to the first adder, the first buffer configured to keep and delay the first added signal to generate a second delayed signal;
a decoder coupled to the first buffer, the decoder configured to receive and decode the first delayed signal to generate a decoded signal;
a second adder coupled to the decoder and the first buffer, the second adder configured to summarize the decoded signal and the second delayed signal to generate a second added signal; and
a second buffer coupled to the first adder, the second adder and the detector, the second buffer configured to keep and delay the second added signal to generate the first delayed signal;

wherein the IDD circuit is configured to perform M outer iterations on the MIMO signals between the detector and the decoder to obtain the decoded signal, of which Ni inner iterations are performed in the decoder during an $i^{th}$ outer iteration of the outer iterations, wherein M is an integer greater than 1, i is an integer less than or equal to M, and $N_1$ to $N_M$ are all integers and are in a strictly increasing sequence.

13. The MIMO receiver of claim 12, wherein M is 3.

14. The MIMO receiver of claim 13, wherein $N_1$, $N_2$ and $N_3$ are respectively 2, 4 and 6.

15. The MIMO receiver of claim 12, further comprising:
a decision circuit coupled to the IDD circuit, the decision circuit configured to convert the decoded signal into binary data depending on a threshold value.

16. The MIMO receiver of claim 12, further comprising:
a plurality of fast Fourier transformers (FFTs) respectively coupled to the antennas, the FFTs configured to convert the MIMO signals to frequency domain signals.

* * * * *